United States Patent
Choudary et al.

(10) Patent No.: US 6,787,119 B2
(45) Date of Patent: Sep. 7, 2004

(54) PROCESS FOR THE PREPARATION OF DINITRAMIDIC ACID AND SALTS THEREOF

(75) Inventors: Boyapati Manoranjan Choudary, Andhra Pradesh (IN); Mannepalli Lakshmi Kantam, Andhra Pradesh (IN); Katuri Jeeva Ratnam, Andhra Pradesh (IN); Vijayakumar Karasala, Andhra Pradesh (IN); Sridhar Chidara, Andhra Pradesh (IN); Venkatachalam Subbiah, Kerala (IN); Santosh Gopalakrishnan, Kerala (IN); Ramaswamy Rajagopalan, Kerala (IN); Ninan Ninan Kovoor, Kerala (IN); Kuchibhatla Sitarama Sastri, Kerala (IN)

(73) Assignee: Council of Scientific and Industrial Research, New Delhi (IN)

( * ) Notice: Subject to any disclaimer, the term of this patent is extended or adjusted under 35 U.S.C. 154(b) by 197 days.

(21) Appl. No.: 10/098,170

(22) Filed: Mar. 13, 2002

(65) Prior Publication Data

US 2003/0175197 A1 Sep. 18, 2003

(51) Int. Cl.$^7$ .......................... C01B 21/20; C01B 21/48

(52) U.S. Cl. ..................... 423/387; 423/396; 149/122
(58) Field of Search .................... 149/122; 423/387, 423/396

(56) References Cited

U.S. PATENT DOCUMENTS

| 5,198,204 A | 3/1993 | Bottaro et al. ............... 423/385 |
| 5,976,483 A | 11/1999 | Langlet et al. ............... 423/385 |

OTHER PUBLICATIONS

Bottaro et al, "1,1,3,3-Tetraoxo-1,2,3-Triazapropene Anion, A New Oxy Anion of Nitrogen: The Dinitramide Anion and Its Salts", J. Am. Chem. Soc., vol. 119, 1997, pp. 9405-9410.

Primary Examiner—Stanley S. Silverman
Assistant Examiner—Maribel Medina
(74) Attorney, Agent, or Firm—Nixon & Vanderhye P.C.

(57) ABSTRACT

The present invention provides an ecofriendly method for preparing dinitramidic acid and its salts by nitration of ammonium sulfamate with fuming nitric acid as a nitrating agent using solid acid catalysts selected from the group consisting of a montmorillonite clay catalyst and metal ion exchanged K10 montmorillonite clay catalysts and surface supported catalysts and preparation of ammonium dinitramide by neutralization of the dinitramidic acid with ammonia and separation of ammonium dinitramide.

16 Claims, No Drawings

PROCESS FOR THE PREPARATION OF DINITRAMIDIC ACID AND SALTS THEREOF

FIELD OF THE INVENTION

The present invention relates to a process for the preparation of dinitramidic acid and salts thereof. In particular the present invention relates to a process for the preparation of dinitramidic acid and salts ammonium dinitramide (ADN)/potassium dinitramide using solid acid catalysts such as metal ion exchanged clay catalysts and surface supported catalysts which finds use in making high-energy solid propellants. Ammonium dinitramide (hereafter referred to as ADN) is considered a suitable replacement for ammonium perchlorate (AP) in solid propellant formulations. It is a good halogen free oxidizer with better performance characteristics for use in solid propellant applications.

The present invention also relates to a novel and an ecofriendly process for the preparation of dinitramidic acid by nitration of ammonium sulfamate with fuming nitric acid as a nitrating agent using solid acid catalysts selected from the group consisting of a montmorillonite clay catalyst and metal ion exchanged K10 montmorillonite clay catalysts and surface supported catalysts and preparation of ammonium dinitramide by neutralization of the dinitramidic acid with ammonia and separation of ammonium dinitramide by a conventional work-up procedure. The same process is also used for making potassium dinitramide, which is prepared by taking potassium sulfamate as the starting material and KOH as the neutralising agent.

BACKGROUND OF THE INVENTION

Nitration is generally performed by the classical method employing the $H_2SO_4$—$HNO_3$ system and also with strong nitrating agents such as $NO_2BF_4$ or $N_2O_5$.

Reference may be made to U.S. Pat. Nos. 5,316,749 and 5,316,749A, wherein ammonium salt of 1,1,3,3-tetraoxo-1,2,3-triazapropene anion (ADN) is prepared by the direct nitration of ammonia. Nitration is carried out at very low temperatures (−78° C.). The formation of the product can be explained by the following equations:

$$NH_3 + NO_2BF_4 \rightarrow NH_2NO_2 + HBF_4 \quad (1)$$

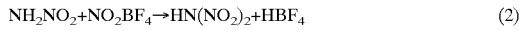

$$NH_2NO_2 + NO_2BF_4 \rightarrow HN(NO_2)_2 + HBF_4 \quad (2)$$

$$HN(NO_2)_2 + 2\ HBF_4 + 3\ NH_3 \rightarrow H_4N(NO_2)_2 + 2\ N\ H_4BF_4 \quad (3)$$

The overall reaction is given in equation (4)

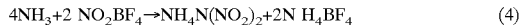

$$4NH_3 + 2\ NO_2BF_4 \rightarrow NH_4N(NO_2)_2 + 2N\ H_4BF_4 \quad (4)$$

Reference may be made to U.S. Pat. Nos. 5,198,204 and 5,254,324, wherein the nitration of monoisocyanates of the type Z—$CH_2$—$CH_2$—NCO, where Z is an electron withdrawing group such as —CN, —COOR, or —COOH to the corresponding alkyl dinitramine is described. The nitration is carried out by using strong nitrating agents such as $NO_2BF_4$ or $N_2O_5$. The alkyl dinitramine gives ADN on treatment with ammonia. The drawbacks are these strong nitrating agents are very expensive and are not suitable for large-scale industrial production of oxidizers.

Reference may be made to U.S. Pat. Nos. 5,145,852 and 5,659,080 wherein the nitration of deactivated amines such as $NH_2NO_2$, $NH_2CONH_2$ or $NH_2COOC_2H_5$ to dinitramidic acid using the nitrating agents such as $NO_2BF_4$ or $N_2O_5$ is described. The drawbacks are these strong nitrating agents are very expensive and are not suitable for large-scale industrial production of oxidizers. Most of the reactions are highly exothermic and involves the use of highly reactive nitrating agents and hence are to be carried out at very low temperatures (−30° C. to −50° C.) in small batches.

Reference may be made a publication by Bottaro et al, J.Am.Chem. Soc, 9305, 1997 wherein ammonium dinitramide is prepared by the reaction of nitramide, nitronium tetrafluoroborate and ammonia or ammonia with $N_2O_5$ or $N_2O_5$ and ammonium nitromethane.

Reference may be made to U.S. Pat. No. 5,976,483 wherein the preparation of dinitramidic acid by nitration of a compound selected from a group consist of $NH_2SO_3H$, $NH(SO_3H)_2$, $N(SO_3H)_3$ and its salts such as ammonium sulfamate using a common nitrating agent such as nitric acid/sulphuric acid or nitric acid/acetic anhydride is described. The invention also relates to a method of preparing dinitramide salt, comprising neutralization of the dinitramidic acid with ammonia, recovery and purification of the salt by passing through a column and then eluted by gradient elution.

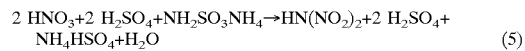

$$2\ HNO_3 + 2\ H_2SO_4 + NH_2SO_3NH_4 \rightarrow HN(NO_2)_2 + 2\ H_2SO_4 + NH_4HSO_4 + H_2O \quad (5)$$

$$HN(NO_2)_2 + 2NH_3 + NH_4HSO_4 \rightarrow NH_4N(NO_2)_2 + (NH_4)_2SO_4 \quad (6)$$

The drawbacks are the use of hazardous sulfuric acid and environmental pollution during disposal of spent acid.

Reference may be made to a publication by Malesa and Skupinski in Propellants, Explosives, Pyrotechnics, 24, 83–89, 1999 wherein the ammonium dinitramide is prepared by the method described by Bottaro et al in acetonitrile and the product is separated by evaporation of the neutralised solution to dryness after filtration, followed by extraction with isopropanol and evaporation to dryness and finally by recrystallization from ethyl acetate.

OBJECTS OF THE INVENTION

The main object of the present invention is to provide an ecofriendly method for preparing dinitramidic acid and its salts by nitration of ammonium sulfamate with fuming nitric acid as a nitrating agent using solid acid catalysts selected from the group consisting of a montmorillonite clay catalyst and metal ion exchanged K10 montmorillonite clay catalysts and surface supported catalysts and preparation of ammonium dinitramide by neutralization of the dinitramidic acid with ammonia and separation of ammonium dinitramide by a conventional work-up procedure which obviates the drawbacks as detailed above.

Another object of the present invention is the use of ecofriendly metal ion exchanged clays as solid acid catalysts in the nitration of ammonium sulfamate, dispensing the use of sulfuric acid which obviates the drawbacks as detailed above.

Another object of the present invention is to dispense the use of the nitrating agents such as $NO_2BF_4$ or $N_2O_5$ which obviates the drawbacks as detailed above.

SUMMARY OF THE INVENTION

The present invention provides an ecofriendly process for the preparation of dinitramidic acid by nitration of ammonium sulfamate with fuming nitric acid as a nitrating agent using solid acid catalysts selected from the group consisting of a montmorillonite clay catalyst and metal ion exchanged K10 montmorillonite clay catalysts and surface supported catalysts. Ammonium dinitramide is then prepared by the neutralization of the dinitramidic acid with ammonia and separation of ammonium dinitramide by a conventional work-up procedure.

Accordingly, the present invention relates to a process for the preparation of dinitramidic acid comprising nitrating ammonium sulfamate with fuming nitric acid as a nitrating agent using a solid acid catalyst selected from the group consisting of a montmorillonite clay catalysts, metal ion exchanged K10 montmorillonite clay catalysts and surface supported catalysts.

In one embodiment of the invention, the catalyst comprises a metal ion exchanged clay, with the metal ion preferably being selected from the group consisting of $Fe^{3+}$, $Al^{3+}$, $La^{3+}$, $Cu^{2+}$ and $Zn^{2+}$.

In another embodiment of the invention, the surface supported catalyst comprises titanium or molybdenum supported on silica-alumina.

In another embodiment of the invention, the reaction is carried out in the presence or absence of solvent.

In another embodiment of the invention, the solvent is selected from carbon tetrachloride and dichloroethane.

In another embodiment of the invention, the nitration is carried out in the absence of sulfuric acid.

In another embodiment of the invention, the solid acid catalyst used act as bifunctional catalysts, generating electrophile nitronium ion as well as instant adsorbent for water formed during the reaction to facilitate electrophilic substitution.

The invention also relates to a process for the preparation of ammonium dinitramide comprising nitrating ammonium sulfamate with fuming nitric acid as a nitrating agent using a solid acid catalyst selected from the group consisting of a montmorillonite clay catalyst, metal ion exchanged K10 montmorillonite clay catalysts and surface supported catalysts, and neutralizing the dinitramidic acid obtained with ammonia as the neutralizing agent and separating ammonium dinitramide.

In one embodiment of the invention, the catalyst comprises a metal ion exchanged clay, with the metal ion preferably being selected from the group consisting of $Fe^{3+}$, $Al^{3+}$, $La^{3+}$, $Cu^{2+}$ and $Zn^{2+}$.

In another embodiment of the invention, the surface supported catalyst comprises titanium or molybdenum supported on silica-alumina.

In another embodiment of the invention, the reaction is carried out in the presence or absence of solvent.

In another embodiment of the invention, the solvent is selected from carbon tetrachloride and dichloroethane.

In another embodiment of the invention, the nitration is carried out in the absence of sulfuric acid.

In another embodiment of the invention, the solid acid catalyst used act as bifunctional catalysts, generating electrophile nitronium ion as well as instant adsorbent for water formed during the reaction to facilitate electrophilic substitution.

In still another embodiment of the present invention, ammonium sulfamate (as such or dispersion in inert solvents) is nitrated with 100% nitric acid in the presence of metal ion exchanged clay catalysts and the reaction monitored by measuring the concentration of dinitramidic acid by UV spectroscopy.

DETAILED DESCRIPTION OF THE INVENTION

Scientific Explanation

The principal object of the present invention by processing under the above conditions, therefore, was to produce cost effective ammonium dinitramide over the previous reported works. The other object of the present invention was achieved by metal ion exchanged clays as solid acid catalysts replacing the hazardous sulfuric acid or the nitrating agents such as $NO_2BF_4$ or $N_2O_5$ which are very expensive and are not suitable for large-scale industrial production of oxidizers. The novelty of the present invention with respective to the prior art is to produce dinitramidic acid or its salts by nitration of ammonium sulfamate using solid acid catalysts replacing sulfuric acid. Apart from generating nitronium ion, the solid acid catalysts, metal ion exchanged clays also adsorbs water formed in the reaction.

The following examples are given by way of illustration of present invention and therefore should not be construed to limit the scope of the present invention.

EXAMPLE 1

Catalyst Preparation a) Preparation of $Fe^{3+}$-Exchanged Montmorillonite Catalyst:

To 1 lit. of aqueous solution of metal chloride i.e. $FeCl_3$ (1.0 M) taken in a 2 lit. beaker, 80 g of K10 montmorillonite (obtained from M/S Fluka, a Sigma Aldrich company-Switzerland) was added. The mixture was stirred for 16–30 h in order to saturate the exchange capacity of K10 montmorillonite at ambient temperature. The clay suspension was centrifuged and the supernatant solution was discarded. The clay catalyst was filtered, washed with distilled water and the washing cycles were repeated until disappearance of chloride ions from the discarded water. Thus obtained metal exchanged clay was dried overnight in an oven at 120° C. and finely ground in a mortar. Metal-ion exchanged clays such as $Fe^{3+}$, $Al^{3+}$, $La^{3+}$, $Cu^{2+}$ and $Zn^{2+}$ catalysts were prepared in a similar procedure by dissolving the corresponding metal salts.

b) Titanium Supported on Silica-Alumina (TISIAL):

Sodium silicate (40% solution, 520 g) was mixed with aluminium sulfate (200 g) in 600 ml of distilled water. The pH of the solution was then lowered to ~1 by dropwise addition of nitric acid and stirred well, kept aside overnight. Next day the solution was warmed to 80° C. and titanium tetrachloride (100 ml) was added in portions and stirred well for few hours. This was cooled and liquor ammonia solution was added till the pH reaches ~4 to 5. The precipitated catalyst was filtered, and washed several times with distilled water, extruded and dried. The dried catalyst (140 g) was calcined in air at 750° C. for six hours.

c) Molybdenum Supported on Silica-Alumina (MOSIAL):

Sodium silicate (40% solution, 520 g) was mixed with aluminium sulfate (200 g) in 600 ml of distilled water. The pH of the solution was then lowered to ~1 by dropwise addition of nitric acid and stirred well, kept aside overnight. Next day the solution was warmed to 80° C. and ammonium molybdate (30 g) in 200 ml of water was added in portions and stirred well for few hours. This was cooled and liquor ammonia solution was added till the pH reaches ~4 to 5. The precipitated catalyst was filtered and washed several times with distilled water, extruded and dried. The dried catalyst (140 g) was calcined in air at 750° C. for six hours.

d) Acid Treated Catalysts (TISIAL—AT and MOSIAL—AT):

The calcined TISIAL or MOSIAL catalysts (10 g) were treated with 100 ml of 50% Sulfuric acid, filtered and dried further at 300° C. for 3 hours and were stored in a desiccator.

The TISIAL treated with acid is referred as TISIAL—AT and MOSIAL treated with acid is referred as MOSIAL—AT.

EXAMPLE 2

Fuming $HNO_3$ (60 g) and $Fe^{3+}$-montmorillonite (5 g) were mixed in a three necked round bottom flask equipped with a thermometer and mechanical stirrer and cooled to −40° C. To this well mixed nitrating mixture, ammonium sulfamate was added in small portions in a period of 5 minutes, and the stirring was continued. After 60 minutes the reaction mixture was added to 100 g of ice, then neutralised by using ammonia till the pH reaches to 7. During the addition of ammonia the temperature was not allowed to exceed beyond −20° C.

Recovery of ADN

After neutralisation, the reaction mixture was filtered and evaporated to dryness. The solid was extracted with acetonitrile and evaporated to dryness. The same process was repeated for 2 times and then the extraction was carried out with isopropanol followed by evaporation. Finally the crude product was recrystallised with ethyl acetate to obtain ADN of purity more than 98%. The over all reaction yield was 19%.

EXAMPLE 3

Fuming $HNO_3$ (60 g) and $Fe^{3+}$-montmorillonite (1 g) were mixed in a three necked round bottom flask equipped with a thermometer and mechanical stirrer and cooled to −40° C. To this well mixed nitrating mixture, ammonium sulfamate was added in small portions in a period of 5 minutes, and the stirring was continued. After 60 minutes the reaction mixture was added to 100 g of ice, then neutralised by using ammonia till the pH reaches to 7. During the addition of ammonia the temperature was not allowed to exceed beyond −20° C.

Recovery of ADN

After neutralisation, the reaction mixture was filtered and evaporated to dryness. The solid was extracted with acetonitrile and evaporated to dryness. The same process was repeated for 2 times and then the extraction was carried out with isopropanol followed by evaporation. Finally the crude product was recrystallised with ethyl acetate to obtain ADN of purity more than 98%. The over all reaction yield was 14%.

EXAMPLE 4

Fuming $HNO_3$ (60 g), carbon tetrachloride (10 ml) and $Fe^{3+}$ montmorillonite (5 g) were mixed in a three necked RB flask equipped with a thermometer and mechanical stirrer and cooled to −40° C. To this well mixed nitrating mixture, ammonium sulfamate was added in small portions in a period of 5 minutes, and the stirring was continued. After 60 minutes the reaction mixture was added to 100 g of ice, then neutralised by using ammonia till the pH reaches to 7. During the addition of ammonia the temperature was not allowed to exceed beyond −20° C.

Recovery of ADN

After neutralisation, the reaction mixture was filtered and evaporated to dryness. The solid was extracted with acetonitrile and evaporated to dryness. The same process was repeated for 2 times and then the extraction was carried out with isopropanol followed by evaporation. Finally the crude product was recrystallised with ethyl acetate to obtain ADN of purity more than 98%. The over all reaction yield was 19%.

EXAMPLE 5

A mixture of fuming $HNO_3$ (0.5 M, 31.5 g) and MOSIAL or TISIAL (10 g) were taken in a jacketed reactor and cooled to −30° C. To this mixture was then added ammonium sulfamate (0.05 M, 5.7 g powdered) in portions. The contents of the mixture was stirred well for 20 to 30 minutes and then added to crushed ice in one portion and then diluted with ammonia till the solution becomes neutral. The neutralized solution was filtered and analysed by UV and further processed to recover ADN. The yield of the product was 7%.

EXAMPLE 6

Nitration experiment was done using TISIAL—AT or MOSIAL—AT instead of MOSIAL or TISIAL. Otherwise the procedure was same as in Example 5. The product yield was found to be 17%.

TABLE 1

Preparation of ammonium dinitramide by metal ion exchanged clay catalysts

| Example | Fuming nitric acid (g) | Catalyst (g) | Reaction time (min) | Isolated yield (%) |
|---------|------------------------|--------------|---------------------|---------------------|
| 2 | 60 | 5 | 30 | 19 |
| 3 | 60 | 1 | 30 | 14 |
| 4 | 60 | 5 | 30 | 23 |
| 5 | 45 | 6 | 30 | 7.0 |
| 6 | 75 | 10 | 45 | 17.0 |

The main advantages of the present investigation are:

1. A simplified and ecofriendly process for the preparation of dinitramidic acid and salts ammonium dinitramide and potasium dinitramide.

2. The use of sulfuric acid, a hazardous chemical is dispensed with.

3. There is no need to handle strong nitrating agents such as $NO_2BF_4$ or $N_2O_5$, which are very expensive and are not suitable for large scale preparation of oxidizers.

4. The present process envisages no disposal problem as the catalyst can be reused.

5. The present process is environmentally safe since there is no effluent disposable problem.

We claim:

1. A process for the preparation of dinitramidic acid comprising nitrating ammonium sulfamate with fuming nitric acid as a nitrating agent using a solid acid catalyst selected from the group consisting of a montmorillonite clay catalyst, metal ion exchanged K10 montmorillonite clay catalyst and a surface supported catalyst to obtain dinitramidic acid.

2. A process as claimed in claim 1 wherein the catalyst comprises a metal ion exchanged clay.

3. A process as claimed in claim 1 wherein the metal ion in the metal ion exchanged catalyst is selected from the group consisting of $Fe^{3+}$, $Al^{3+}$, $La^{3+}$, $Cu^{2+}$ and $Zn^{2+}$.

4. A process as claimed in claim 1 wherein the surface supported catalyst comprises titanium or molybdenum supported on silica-alumina.

5. A process as claimed in claim 1 wherein the reaction is carried out in the absence of solvent.

6. A process as claimed in claim 1 wherein the reaction is also carried out in the presence of a solvent selected from carbon tetrachloride and dichloroethane.

7. A process as claimed in claim 1 wherein the nitration is carried out in the absence of sulfuric acid.

8. A process as claimed in claim 1 wherein the solid acid catalyst used act as bifunctional catalysts, generating electrophile nitronium ion as well as instant adsorbent for water formed during the reaction to facilitate electrophilic substitution.

9. A process for the preparation of ammonium dinitramide comprising nitrating ammonium sulfamate with fuming nitric acid as a nitrating agent using a solid acid catalyst selected from the group consisting of a montmorillonite clay catalyst, metal ion exchanged K10 montmorillonite clay catalysts and surface supported catalysts, and neutralizing the dinitramidic acid obtained with ammonia as the neutralizing agent and separating ammonium dinitramide.

10. A process as claimed in claim 9 wherein the catalyst comprises a metal ion exchanged clay.

11. A process as claimed in claim 9 wherein the metal ion in the metal ion exchanged catalyst is selected from the group consisting of $Fe^{3+}$, $Al^{3+}$, $La^{3+}$, $Cu^{2+}$ and $Zn^{2+}$.

12. A process as claimed in claim 9 wherein the surface supported catalyst comprises titanium or molybdenum supported on silica-alumina.

13. A process as claimed in claim 9 wherein the reaction is carried out in the absence of solvent.

14. A process as claimed in claim 9 wherein the reaction is also carried out in the presence of a solvent selected from carbon tetrachloride and dichloroethane.

15. A process as claimed in claim 9 wherein the nitration is carried out in the absence of sulfuric acid.

16. A process as claimed in claim 9 wherein the solid acid catalyst used act as bifunctional catalysts, generating electrophile nitronium ion as well as instant adsorbent for water formed during the reaction to facilitate electrophilic substitution.

* * * * *